(12) United States Patent
Ah-Pine et al.

(10) Patent No.: US 8,275,608 B2
(45) Date of Patent: Sep. 25, 2012

(54) CLIQUE BASED CLUSTERING FOR NAMED ENTITY RECOGNITION SYSTEM

(75) Inventors: Julien Ah-Pine, La Tronche (FR); Guillaume Jacquet, Biviers (FR)

(73) Assignee: Xerox Corporation, Norwalk, CT (US)

( * ) Notice: Subject to any disclaimer, the term of this patent is extended or adjusted under 35 U.S.C. 154(b) by 900 days.

(21) Appl. No.: 12/167,382

(22) Filed: Jul. 3, 2008

(65) Prior Publication Data

US 2010/0004925 A1    Jan. 7, 2010

(51) Int. Cl.
*G06F 17/27* (2006.01)
*G10L 15/06* (2006.01)
*G06F 17/21* (2006.01)
*G06F 17/30* (2006.01)
*G06F 7/00* (2006.01)

(52) U.S. Cl. ............... 704/9; 704/10; 704/245; 707/776
(58) Field of Classification Search ................ 704/9, 10, 704/245
See application file for complete search history.

(56) References Cited

U.S. PATENT DOCUMENTS

| 7,031,909 | B2 * | 4/2006 | Mao et al. ..................... 704/9 |
| 7,813,916 | B2 * | 10/2010 | Bean ............................... 704/9 |
| 7,899,666 | B2 * | 3/2011 | Varone ............................ 704/9 |
| 8,001,144 | B2 * | 8/2011 | Novak ......................... 707/776 |
| 2007/0233656 | A1 | 10/2007 | Bunescu et al. |
| 2008/0040352 | A1 | 2/2008 | Ellis |
| 2008/0065621 | A1 | 3/2008 | Ellis |
| 2009/0204596 | A1 | 8/2009 | Brun et al. |

OTHER PUBLICATIONS

Automatic extraction of semantic relations from specialized corpora by Aristomenis Thanopoulos, Nikos Fakotakis and George Kokkinakis, COLING 2000, Proceedings of the 18th conference on Computational linguistics—vol. 2, pp. 836-842.*
A. Cucchiarelli, P. Velardi, Unsupervised Named Entity Recognition using syntactic and semantic contextual evidence, Computational Linguistics, 27(1), 2001.*
Ait-Mokhtar, et al., "Incremental Finite-State Parsing," In Proceedings of Applied Natural Language Processing, Washington, D.C. (1997).
Ait-Mokhtar et al., "Robustness beyond shallowness: incremental dependency parsing," NLE Journal (2002).
Bron et al., "Algorithm 457: Finding all cliques of an undirected graph," in Communications of the ACM, vol. 16, Issue 9, ACM Press: New York (1973).
Bunescu et al., "Using encyclopedic knowledge for named entity disambiguation," In Proceedings of the 11th Conference of the European chapter of the association for Computational Linguistics, (2006).
Chinchor, "Named Entity Task Definition," Sep. 1997.

(Continued)

*Primary Examiner* — Pierre-Louis Desir
*Assistant Examiner* — Neeraj Sharma
(74) *Attorney, Agent, or Firm* — Fay Sharpe LLP

(57) ABSTRACT

A soft clustering method comprises (i) grouping items into non-exclusive cliques based on features associated with the items, and (ii) clustering the non-exclusive cliques using a hard clustering algorithm to generate item groups on the basis of mutual similarity of the features of the items constituting the cliques. In some named entity recognition embodiments illustrated herein as examples, named entities together with contexts are grouped into cliques based on mutual context similarity. Each clique includes a plurality of different named entities having mutual context similarity. The cliques are clustered to generate named entity groups on the basis of mutual similarity of the contexts of the named entities constituting the cliques.

21 Claims, 3 Drawing Sheets

OTHER PUBLICATIONS

Cucerzan, "Large-scale named entity disambiguation based on Wikipedia data," In Proceedings of the 1007 Joint Conference on EMNLP and CoNLL, Prague, Czech Republic (2007).

Ehrmann et al., "Vers une double annotation des entites nommees," Traitement Automatique des Langues, 47(3), (2007).

Fox et al., "Combination of multiple searches," In Proceedings of the 3rd NIST TREC Conference, pp. 105-109 ( 1994).

Harris, "Structural Linguistics," The University of Chicago Press, Chapters 1-2., pp. 1-24 (1951).

Hartigan, Clustering Algorithms, John Wiley & Sons, pp. 75-83, pp. 169-177 (1975).

Kilgarriff et al., "The sketch engine," in Proceedings of EURALEX, (2004).

Lavrenko et al., "Language Modeling for Information Retrieval," Kluwer Academic Publishers, W.B. Croft and J. Lafferty, editors, Kluwer Academic Publishers, (2003).

Lin, "Using collocation statistics in information extraction," In Proceedings of the Seventh Message Understanding Conference (MUC-7), (1998).

Lin et al., "Induction of semantic classes from natural language text," in Proceedings of ACM SIGKDD Conference on Knowledge Discovery and data Mining, (2001).

Marcotorchino, "Block Seriation Problems: A Unified Approach," Applied Stochastic Models and data Analysis, vol. 3, pp. 73-91 (1987).

Ngomo, "Signum, a graph algorithm for terminology extraction," in Proceedings of the 9th International Conference on Intelligent Text Processing and Computational Linguistics (CICLING 2008), Haifa, Israel, (2008).

Pasca, "Acquisition of categorized named entities for web search," In CIKM '04: Proceedings of the 13th ACM international conference on Information and knowledge management, New York, NY, US, (2004).

Pantel et al., "Automatically labeling semantic classes," In Proceedings of Human Language Technology/North American Chapter of the Association for Computational Linguistics (HLT/NAACL-04), Boston, MA, US, (2004).

Ehrmann, "Les entits nommees, de la linguistique au TAL: reflexion theorique sur la notion d'entite nommee et premiers pas vers la desambiguisation," PhD thesis, University of Paris 7, (Jun. 2008).

Ploux et al., "Construction d'espaces semantiques a l'aide de dictionnaires de synonymes," TAL, 39(1), (1998).

Victorri, "Espaces semantiques et representation du sens," ec/arts, 3, (2002).

Zweigenbaum et al., "Cooperation apprentissage en corpus et connaissances du domaine pour la construction d'ontologies," In Proceedings of 1eres Journes scientifiques et techniques FRANCIL 97, Avignon (1997).

* cited by examiner

CLIQUE BASED CLUSTERING FOR NAMED ENTITY RECOGNITION SYSTEM

BACKGROUND

The following relates to the informational arts, computer arts, clustering and classification arts, and related arts. Some illustrative applications of the following include named entity recognition and annotation, content clustering, and so forth.

Named entity recognition systems are configured to identify and annotate named entities, such as names of persons, locations, or organizations. The system may label such named entities by entity type (for example, person, location, or organization) based on the context in which the named entity appears. Problematically, the same named entity may have different usages. For example, "Oxford" may refer to a city, a university, or a football team, among other usages, and as a city may refer to any of numerous different cities named "Oxford" that exist in England, in Ohio, and elsewhere.

Named entity recognition is a specific instance of the more general problem of soft clustering, in which items are to be assigned to non-exclusive groups based on features of the items. In soft clustering, a given item may be assigned to more than one group; in contrast, hard clustering requires that each item be assigned exclusively to a single group. Named entity recognition is a soft clustering problem since, for example, Oxford may be assigned to each of the groups "Cities", "Universities", and "Football teams", among others.

Named entity recognition is also an example of a soft clustering problem in which differing levels of specificity in the groupings may be desirable. For example, "Oxford" may be annotated more generally as a city, or more specifically as a city in England. Using numerous small groups provides high specificity in the annotation; on the other hand, an unacceptably large number of (typically small) groups can lead to high computational complexity and difficulty in manually, automatically, or semi-automatically assigning annotations or labels to the large number of groups. Existing soft clustering techniques generally require an a priori selection of the number of groups, which limits flexibility and can lead to forced grouping of unrelated items or forced separation of related items.

BRIEF DESCRIPTION

In some illustrative embodiments disclosed as illustrative examples herein, a annotation method is disclosed, comprising: identifying named entities in a corpus together with contexts; grouping the named entities into cliques based on mutual context similarity, each clique including a plurality of different named entities having mutual context similarity, the grouping of the named entities into cliques being non-exclusive; clustering the cliques to generate named entity groups on the basis of mutual similarity of the contexts of the named entities constituting the cliques; assigning annotations to the named entity groups; and annotating named entity instances of the corpus based on the named entity groups and corresponding assigned annotations.

In some illustrative embodiments disclosed as illustrative examples herein, an annotation system is disclosed, comprising: a named entity detector configured to identify named entities in a corpus together with contexts; a cliques identifier configured to receive and group the named entities into cliques based on mutual context similarity, each clique including a plurality of different named entities having mutual context similarity; and a cliques clusterer configured to receive and cluster the cliques to generate named entity groups on the basis of mutual similarity of the contexts of the named entities constituting the cliques.

In some illustrative embodiments disclosed as illustrative examples herein, a storage medium is disclosed that stores instructions executable to perform a soft clustering method comprising (i) grouping items into non-exclusive cliques based on features associated with the items, and (ii) clustering the non-exclusive cliques using a hard clustering algorithm to generate item groups on the basis of mutual similarity of the features of the items constituting the cliques.

DETAILED DESCRIPTION

The soft clustering approaches disclosed herein employ clustering of cliques to generate nonexclusive groups without designating a priori the number of groups. Cliques, as used herein, are nonexclusive groups of items in which every pair of items in the clique has similarity of features. This requirement of pairwise similarity for each pair of items in the clique is a strong requirement, which typically leads to generation of a large number of cliques, some of which may have few items. Thus, grouping into cliques provide high specificity, and additionally as nonexclusive groupings such cliques comport with the nonexclusivity requirement of soft clustering.

On the other hand, clique grouping techniques tend to generate a large number of small cliques, due to the requirement that each item of the clique must exhibit pairwise similarity with every other item in the clique. Having many small cliques can be problematic for applications such as named entity recognition.

The soft clustering techniques disclosed herein employ clustering of cliques. Such clustering can employ hard clustering while still satisfying the soft clustering requirement of nonexclusive groups, because what is being clustered is not individual items but rather nonexclusive cliques of items. Accordingly, a hard clustering technique such as a relational analysis-based clustering algorithm can be employed, which does not impose an a priori selection of the number of groups. Alternatively, an efficient hard clustering technique such as k-means can be run repeatedly with different numbers of clusters and the best result selected, which has the effect of providing hard clustering without fixing a priori the number of groups.

Figure 1:
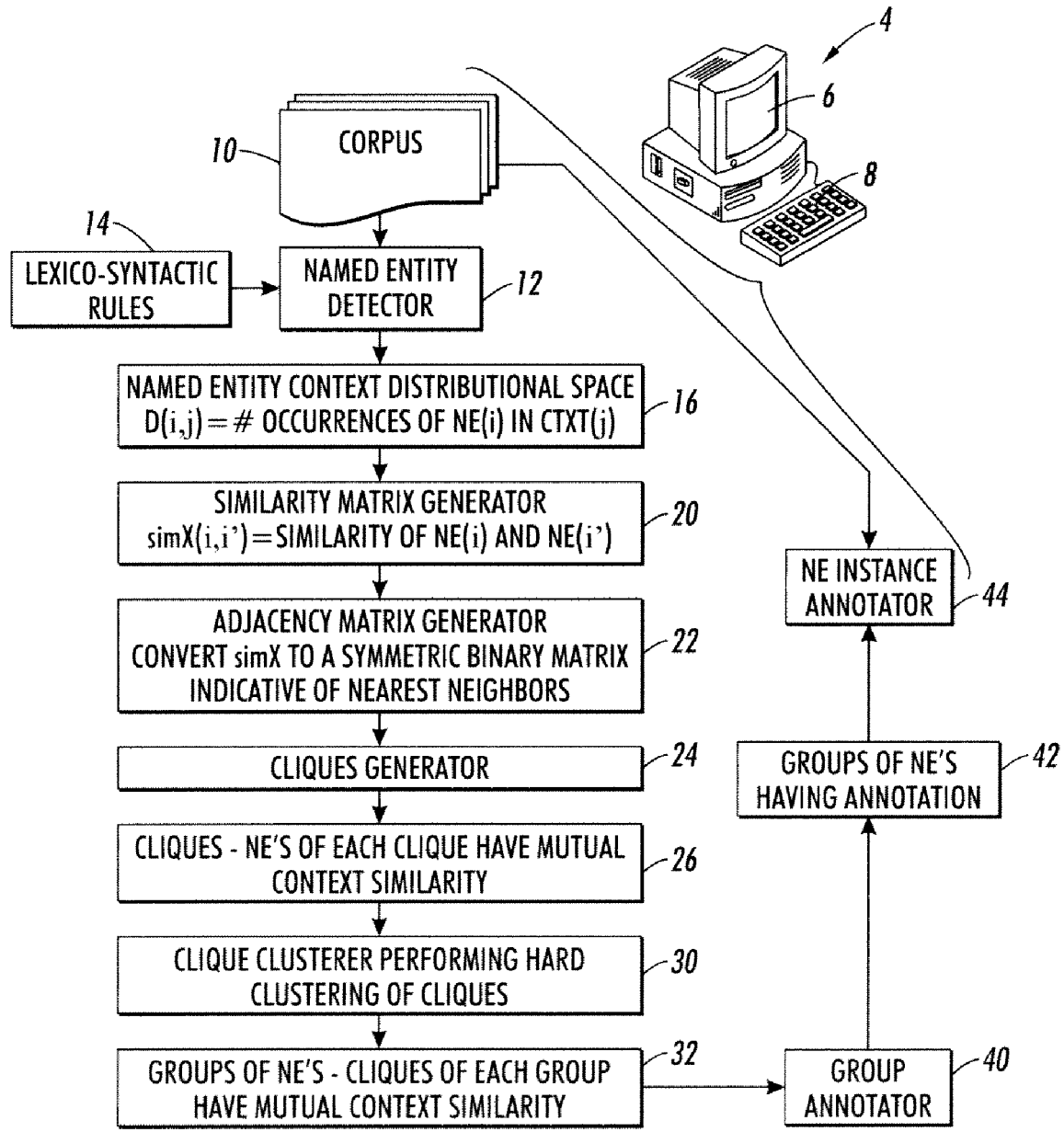
FIG. 1 diagrammatically shows a named entities recognition system employing clustering of cliques.

With reference to FIG. 1, the illustrated embodiments relate to using such soft clustering techniques in a named entity recognition system. The named entity recognition system is suitably embodied as a computer 4 or other digital processing device running suitable software to perform named entity recognition system operations. The illustrated computer 4 includes a display 6 for displaying results, and a keyboard 8, mouse, or other input device for facilitating user control of the named entity recognition system. The software is suitably embodied as instructions stored on a magnetic disk, optical disk, magnetic tape, FLASH memory, random access memory (RAM), read-only memory (ROM), or other storage medium, such instructions being executable by the computer 4 or other digital device to perform the disclosed named entity recognition methods. Although described with reference to illustrative named entity applications, it will be appreciated that the soft clustering techniques disclosed herein employing clustering of cliques are also applicable to other soft clustering applications.

With continuing reference to FIG. 1, the named entity system generates named entity classes based on occurrences of named entities in a corpus 10 of text-based documents. An effect of this is that the named entity recognition system is configured for the corpus 10. The corpus 10 may, for example, comprise electronic documents on a topic of interest (or of general interest) sampled from the Internet, or from a corporate digital data network, or from some other source. The documents are text-based, but may also include images, tables, or so forth. Instances of named entities in the corpus 10 typically occur in context of other surrounding text, and this context provides information for determining an appropriate annotation for the named entity.

A named entity detector 12 processes the corpus 10 to identify occurrences of named entities together with context for each identified named entity. The named entity detector 12 can utilize various approaches for identifying named entities. In one approach, a lexicon or other resource is accessed to identify named entities in conjunction with lexico-syntactic rules 14. Heuristics can also be used, for example employing a rule that capitalized words (other than those beginning a sentence) are more likely to be named entities (or components thereof) as compared with uncapitalized words. Titular words such as "Dr." or "Mrs." may also be incorporated into rules for identifying named entities. Other lexico-syntactic constraints can similarly be utilized. In some embodiments, the corpus 10 may itself include tags or other structure identifying some named entities.

In one suitable embodiment of the named entity detector 12, the following lexico-syntactic rules are employed. In one rule, a named entity is identified as a noun starting with an upper-case letter (or a noun phrase) which is a rector argument of an attribute syntactic relation with a noun as rected argument, or a rected argument of a modifier syntactic relation with a noun as a rector argument. Some examples of application of these rules are as follows:

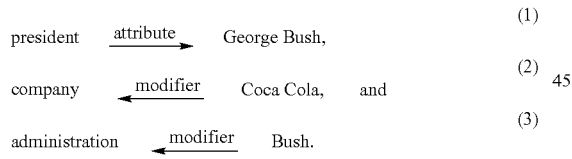

In some embodiments, named entities are not considered for annotation unless they occur a threshold number of times in the corpus 10. This constraint reduces noise. The output of the named entity detector 12 is a list of lexical expressions providing named entities. The list of named entities extracted from the corpus 10 by the named entity detector 12 is denoted herein as NE, and the number of named entities is denoted herein as |NE|.

Typically, named entities that appear in similar contexts are semantically similar. In other words, two named entities that typically occur in similar contexts are likely to be semantically similar (see, e.g., Harris, *Structural Linguistics*, 1951). To analyze such similarities, the list of named entities NE is suitably arranged as a named entity context distributional space 16 having elements $D(i,j)$ where the index i indexes the named entity $NE_i$ and the index j indexes the context $CTXT_j$. The value of element $D(i,j)$ indicates the number of occurrences of the named entity $NE_i$ having the context $CTXT_j$ in the corpus 10. One suitable approach for constructing the distributional space 16 employs a parser such as the Xerox Incremental Parser (XIP; see, e.g. Aït et al., "Incremental finite-state parsing", in Proceedings of Applied Natural Language Processing, Washington, D.C., 1997; Aït et al., "Robustness beyond shallowness: incremental dependency parsing", NLE Journal, 2002; both of which are incorporated herein by reference). Parsing enables identification of chunks and some syntactic dependencies between these chunks. Given this parser output, triple instances of the form $w_1.R.w_2$ are identified, where $w_1$ and $w_2$ are chunks and R is a syntactic relation. The identified triple instances are used to build the distributional space 16. Each triple provides two contexts, namely the context $w_1.R$ and the context $R.w_2$, and provides two chunks, namely $w_1$ and $w_2$. The chunks of interest relate to named entities, for example triples in which $w_1 \in NE$ or $w_2 \in NE$. Each point of this space is a named entity (with the form $w_1$ or $w_2$) and each dimension (that is, the j coordinate of the distributional space 16) is a syntactic context CTXT of the form $R.w_2$ or $w_1.R$. The resulting distributional space 16 has dimensions $|NE| \times |CTXT|$ where the index i runs from 1 ... |NE| and the index j runs from 1 ... |CTXT|. The term $D(i,j)$ denotes the number of occurrences of the context $CTXT_j$ associated with named entity $NE_i$.

Generation of the distributional space 16 is further described with reference to an example, namely the sentence portion "provide Albania with food aid". Parsing this sentence portion (with "aid" and "food aid" considered to be different chunks) yields the following three triples:

OBJ-IND('VERB:provide','NOUN: Albania') (4),

PREP WITH('VERB: provide','NOUN:aid') (5), and

PREP WITH('VERB: provide','NP:food aid') (6).

From these three triples the following chunks can be derived: VERB:provide; NOUN:Albania; NOUN:aid; and NP:food aid where "NP" denotes "noun phrase". Further, from these three triples the following contexts can be derived:

1.VERB: provide. OBJ-IND (7),

1. VERB: provide.PREP WITH (8),

2. NOUN: Albania.OBJ-IND (9),

2. NOUN: aid. PREP WITH (10), and

2. NP: food aid. PREP WITH (11).

In the context (7) the preceding "1" means that the verb "provide" is the rector argument of the relation OBJ-IND (indirect object). Applying the named entity selection rules, only the chunk NOUN:Albania is identified as a named entity, and its contexts include only the context (7).

Various approaches can be used to reduce the number of chunks and contexts. For example, a suitable heuristic is: each named entity chunk and each context should appear more than n times in the corpus 10 in order to be included in the distributional space 16.

The operation of grouping the named entities into cliques based on mutual context similarity is performed based on the distributional space 16. Each clique produced by the grouping includes a plurality of different named entities having mutual context similarity. The grouping of the named entities into cliques is non-exclusive, by which it is meant that a given named entity may be a member of more than one clique. For named entities, this enables the same named entity to belong to different cliques, with each clique being reflective of a particular context or set of mutually similar contexts in which the named entity occurs. Because the approaches disclosed herein employ clustering of cliques, there is no desire at this stage to limit the number of cliques—to the contrary, it is desired that the grouping into cliques does not designate a predetermined number of cliques. This enables the grouping to be flexible and to produce as many cliques as are appropriate given the number of named entities and the diversity of contexts embodied in the distributional space 16.

The grouping into cliques can be performed using substantially any grouping technique that generates nonexclusive cliques. In the illustrative embodiment of FIG. 1, a cliques identifier 20, 22, 24 includes: (i) a similarity matrix generator 20 that generates a similarity matrix, denoted herein as simX (i,i'), of dimensions |NE|×|NE| whose elements (i,i) indicate similarity of named entities $NE_i$ and $NE_{i'}$; (ii) an adjacency matrix generator 22 that converts the similarity matrix simX (i,i') into a binary adjacency matrix indicative of nearest neighbors, denoted herein as simX_bin(i,i') of dimensions |NE|×|NE| whose elements (i,i') indicate whether named entities $NE_i$ and $NE_{i'}$ are deemed to be "nearest neighbors" in terms of pairwise mutual similarity of contexts; and (iii) a cliques generator 24 that selects cliques based on the binary adjacency matrix indicative of nearest neighbors 22. The output of the cliques identifier 20, 22, 24 is a set of cliques 26, wherein the named entities of each clique have mutual context similarity. By "mutual context similarity" it is meant that any pair of named entities in a given clique have context similarity with each other, or, in other words, there is a pairwise context similarity between the named entities of a given clique.

A suitable embodiment of the components of the illustrative cliques identifier 20, 22, 24 is described. The probability of occurrence of a $NE_i$ in a context $CTXT_j$ can be estimated using maximum likelihood $P_{ml}$ as follows:

$$P_{ml}(CTXT_j|NE_i) = \frac{\#(CTXT_j, NE_i)}{|NE_i|}, \quad (12)$$

where $\#(CTXT_j, NE_i) = D(i,j)$ is the number of times the named entity $NE_i$ is associated to the context $CTXT_j$ and:

$$|NE_i| = \sum_{j=1}^{|CTXT|} D(i,j) = \sum_{j=1}^{|CTXT|} \#(CTXT_j, NE_i) \quad (13)$$

is the total occurrences of the named entity $NE_i$ in the corpus 10. The maximum likelihood estimation leads to sparse data which reflects the problem of high variance of such an estimation method. In order to counter this problem, smoothing methods are suitably employed which allows distribution of the probability mass found by the maximum likelihood estimation to contexts which have zero occurrences in the corpus 10. Some suitable smoothing methods that can be employed include the Jelinek-Mercer smoothing method:

$$P_s(CTXT_j|NE_i) = (1-\lambda)P_{ml}(CTXT_j|NE_i) + \lambda P(CTXT_j|CORP) \quad (14),$$

or the Dirichlet smoothing method:

$$P_s(CTXT_j|NE_i) = \frac{\#(CTXT_j|NE_i) + \mu P(CTXT_j|CORP)}{|NE_i| + \mu}, \text{ where:} \quad (15)$$

$$P(CTXT_j|CORP) = \frac{\sum_{i=1}^{|NE|} D(i,j)}{\sum_{i,j} D(i,j)} = \frac{\sum_{i=1}^{|NE|} \#(CTXT_j, NE_i)}{\sum_{i,j} D(i,j)} \quad (16)$$

is the probability of occurrence of context $CTXT_j$ in the entire corpus 10 denoted as CORP.

After having smoothed the distribution probabilities, a pairwise similarity measure between named entities is computed. Two suitable measures of pairwise similarity are the Kullback-Leibler divergence:

$$KL(NE_i|NE_{i'}) = \sum_{j=1}^{P} P_s(CTXT_j|NE_i) \cdot \log \frac{P_s(CTXT_j|NE_i)}{P_s(CTXT_j|NE_{i'})}, \quad (17)$$

or the cross-entropy:

$$H(NE_i|NE_{i'}) = \sum_{j=1}^{P} P_s(CTXT_j|NE_i) \cdot \log P_s(CTXT_j|NE_{i'}). \quad (18)$$

The similarity matrix elements simX(i,i') are suitably computed using Equation (17) or using Equation (18), or using another suitable pairwise similarity measure.

The adjacency matrix generator 22 computes a binary similarity matrix, which is preferably symmetric, whose elements simX_bin(i,i') are indicative of whether named entities $NE_i$ and $NE_{i'}$ are nearest neighbors in terms of pairwise similarity. In some embodiments of the adjacency matrix, each named entity is a node of the adjacency matrix while the pairwise similarity between two named entities is an edge. One suitable approach for binarizing the similarity matrix elements simX(i,i') is as follows. Define $simX_{NE(i)}$ as the similarity measures of named entity $NE_i$ with all other named entities $NE_{i'}$, where i'=1, ..., |NE|. That is:

$$simX_{NE(i)} = \{simX(NE_i, NE_{i'}):i'=1, \ldots, |NE|\} \quad (19),$$

Further define $L^*_{NE(i)}$ as the list of named entities ranked according to descending order of their similarity with the named entity $NE_i$. The ordered list $L^*_{NE(i)}$ has |NE| elements (including, in this formalism, i=i' for which similarity is inherently highest). Still further, define $L_{NE(i)}$ as the list $L^*_{NE(i)}$ truncated to include only the "nearest neighbors" where this concept can be defined in various ways. In some embodiments, the number of nearest neighbors is fixed, for example each named entity having precisely N nearest neighbors such that $L_{NE(i)}$ always has N elements. However, fixing the number of nearest neighbors limits flexibility—some named entities may be similar to fewer than a fixed number N other named entities, whereas some other named entities may be similar to more than a fixed number N named entities.

To provide additional flexibility in designating "nearest neighbors", in some embodiments the following approach is used. A maximum value b is set, such that no named entity can have more than b nearest neighbors. In other words, the size of $L_{NE(i)}$ is limited to $|L_{NE(i)}| \leq b$ where $|L_{NE(i)}|$ is the number of nearest neighbors for the named entity $NE_i$. The parameter b lies between 1 and |NE|, and in some embodiments b=10 is used, although other values are also contemplated. A second constraint on the number of nearest neighbors is:

$$\frac{\sum_{k \in L_{NE(i)}} simX(NE_i, NE_k)}{\sum_{k=1}^{|NE|} simX(NE_i, NE_k)} \leq a \quad (20)$$

where $a \in [0,1]$. Intuitively, the constraint of Equation (20) ensures gathering the most relevant nearest neighbors of the named entity $NE_i$ by choosing a number of nearest neighbors that bring in a fractional measure a of similarity. In some embodiments, a=0.2 is used, although other values are also contemplated.

Given the truncated set of nearest neighbors $L_{NE(i)}$ for each named entity $NE_i$, elements of the symmetric binary adjacency matrix simX_bin(i,j) are suitably computed as follows:

$$simX\_bin(i, j) = \begin{cases} 1 & \text{if } NE_{i'} \in L_{NE(i)} \text{ or if } NE_i \in L_{NE(i')} \\ 0 & \text{otherwise} \end{cases} \quad (21)$$

The disjunctive "or" condition in Equation (21) ensures symmetry of the binary adjacency matrix simX_bin(i,j).

The cliques generator 24 determines cliques based on the binary adjacency matrix simX_bin(i,j). A clique in a graph is a set of pairwise adjacent nodes which is equivalent to a complete sub-graph. A maximal clique is a clique that is not a subset of any other clique. The cliques generator 24 suitably identifies the cliques 26 as maximal cliques (see e.g., Bron et al., "Algorithm 457: Finding all cliques of an undirected graph", Communications of the ACM vol. 16, no. 9, ACM Press, New York, 1973, which is incorporated herein by reference). In a suitable representation, membership of named elements in cliques can be represented by a matrix T of the form:

$$T(CLI_j, NE_i) = \begin{cases} 1 & \text{if } NE_i \in CLI_j \\ 0 & \text{otherwise} \end{cases} \quad (22)$$

where CLI denotes the set of cliques having |CLI| elements (cliques), and $CLI_j$ denotes a clique where j runs from 1 to |CLI|. The matrix T has dimensions |CLI|×|NE| where |NE| is the number of named entities in the set of named entities NE under consideration.

In the disclosed named entity recognition system, a clique of named entities can be seen as a precise annotation. For example, the named entity "Oxford" is ambiguous, but the context defined by the clique <"Cambridge", "Oxford", "Edinburgh University", "Edinburgh", "Oxford University"> enables one to disambiguate "Oxford" in such a context as a <university>. The number of cliques identified by the cliques identifier 20, 22, 24 can be large, but this number is subsequently reduced by clustering of cliques.

With continuing reference to FIG. 1, a cliques clusterer 30 receives the cliques 26 and clusters the cliques to generate named entity groups 32. The clustering is performed on the basis of mutual similarity of the contexts of the named entities constituting the cliques 26. As with the clique identification, it is advantageous for the cliques clusterer 30 to not employ a predetermined number of groups. In some embodiments, this lack of a predetermined number of groups is achieved by using a fast hard clustering technique that operates for a fixed number of groups, such as k-means, and rerunning the fast hard clustering technique for different fixed numbers of groups and taking the optimal result. Another suitable embodiment of the cliques clusterer 30 employs a relational analysis hard clustering approach, which does not impose any fixed number of groups on the result. In one view, the cliques clusterer 30 can be viewed as performing a "knowledge discovery" operation by identifying and grouping together cliques that have high mutual contextual similarity without designating a priori the number of groups or the group size (i.e., number of cliques or number of named entities in each group). As the grouped cliques have high mutual contextual similarity, it is expected that a common annotation may be applied to the named entity-context combinations that make up a given group.

Another desired aspect of the grouping of cliques is that it is advantageous to use a grouping algorithm that is amenable to finding small groups of cliques. Such small groups can be viewed as discovery of weak annotations of a named entity for disambiguation purposes. The desire to find small groups further motivates against imposing an a priori selection of the number of groups, since such a constraint may act to bias the clustering toward combining small groups that have less high mutual contextual similarity.

In the following, cliques clustering is performed using a relational analysis (RA) clustering algorithm. Advantageously, the RA algorithm does not impose an a priori value on the number of clusters. The RA algorithm maximizes a partitioning function or criterion F which is given by:

$$F(S, X) = \sum_{i=1}^{N} \sum_{i'=1}^{N} (S_{ii'} - \alpha M(\{S_{ii'}\})) X_{ii'}, \quad (23)$$

where $S_{ii'}$ are elements of a pairwise similarity matrix, the parameter $\alpha \in [0,1]$ is a tuning or control parameter, and $M(\{S_{ii'}\})$ is a central trend measure of the similarities. In one approach, the RA uses the Condorcet's partitioning criterion, which is related to voting theory and employs the following values: $\alpha=0.5$ and $M(\{S_{ii'}\})=0.5 \cdot (S_{ii}+S_{i'i'})$. In another suitable approach, the following values are used: $\alpha=1$ and $$M(\{S_{ii'}\}) = \frac{1}{|S^+|} \sum_{(i,i') \in S^+} S_{ii'},$$

where $S^+=\{(i,i'): S_{ii'}>0\}$ and $|S^+|$ is the cardinal of $S^+$.

The desired solution is designated herein as X. In a hard clustering context, it is a binary relational matrix with the general form:

$$X_{ii'} = \begin{cases} 1 & \text{if clique } CLI_i \text{ is in the same cluster as } CLI_{i'} \\ 0 & \text{otherwise} \end{cases} \quad (24)$$

The solution X represents an equivalence relation, and should satisfy a reflexivity property ($X_{ii}=1$ $\forall i=1, \ldots, |CLI|$), a symmetry property ($X_{ii'}=X_{i'i}$ $\forall i,i'=1, \ldots, |CLI|$), and a transitivity property ($X_{ii'}+X_{i'i''}-X_{ii''} \leq 1$ $\forall i,i',i''=1, \ldots, |CLI|$). In a literal formulation, maximizing the partition function of Equation (23) using $\alpha=1$ and $$M(\{S_{ii'}\}) = \frac{1}{|S^+|} \sum_{(i,i') \in S^+} S_{ii'}$$

tends to put clique $CLI_i$ and clique $CLI_{i'}$ in the same cluster if their similarity measure $S_{ii'}$ is larger than or equal to the mean of positive similarities $$\frac{1}{\#S^+} \sum_{(i,i') \in S^+} S_{ii'}.$$

As the objective function is linear in X and as the constraints on X are linear equations, the clustering problem can be solved using a linear programming solver. In the RA formalism, the clustering problem is a convex problem and has a unique optimal solution. However, in a hard clustering context, $X_{ii'} \in \{0,1\}; \forall i,i'=1,\ldots,|CLI|$, and the RA approach leads to an integer linear program which is NP-hard. As a result it is advantageous to use heuristics for dealing with large data sets. A suitable iterative algorithm for maximizing the partition criterion of Equation (23) is as follows:

$$CONT_j = \sum_{CLI_{i'} \in CLU_j} (S_{ii'} - m) \quad (25)$$

$$= \sum_{CLI_{i'} \in CLU_j} (\langle CLI_i, CLI_{i'} \rangle - m)$$

$$= \left\langle CLI_i, \sum_{CLI_{i'} \in CLU_j} CLI_{i'} \right\rangle - m \sum_{CLI_{i'} \in CLU_j} CLI_{i'}$$

$$= \langle CLI_i, G^j \rangle - m|CLU_j|,$$

where $|CLU_j|$ is the number of cliques in cluster $CLU_j$. In that case, update is performed at each new assignment of $CLI_j$, the representative vector $G^{j*}$ of the cluster $CLU_{j*}$ and also the representative vector of the cluster where $CLI_i$ was taken. In general terms, if nbitr<<N, kmax<<N, and P<<N are assumed, then the algorithm has a O(N) computational complexity. If kmax is set sufficiently high (e.g., to the number of cliques), then computational cost increases with increasing number of groups.

The initialization used for starting the iterative algorithm also impacts its performance. The initialization comprises

---

Require: nbitr = number of iterations; kmax = maximal number of clusters; S = the similarity
matrix
  m ← αM{$S_{ii'}$}
  - Take the first clique $CLI_i$ as the first element of the first cluster
  - k = 1 where k is the current number of cluster
  for l = 1 to nbitr do
    for i = 1 to N do
      for j = 1 to k do
        - Compute the contribution of clique $CLI_i$ with cluster $CLU_j$ : $CONT_j$ =
        $\Sigma_{i' \in CLU_j} (S_{ii'} - m)$
      end for
      - $CLU_{j*}$ is the cluster id which have the highest contribution with clique $CLI_i$ and $CONT_{j*}$
      is the corresponding contribution value
      if $CONT_{j*} < S_{ii} - m \wedge k < kmax$ then
        - Create a new cluster where clique $CLI_i$ is the first element
        - k ← k + 1
      else
        Assign clique $CLI_i$ to cluster $CLU_{j*}$
        if the cluster where was taken $CLI_i$ before its new assignment, is empty then
          - k ← k - 1
        end if
      end if
    end for
  end for

---

In applying the foregoing iterative algorithm, a number of iterations should be provided, or alternatively a delta threshold stopping criterion should be provided to stop the iterative algorithm in order to have an approximate solution in reasonable computation time. A maximum number of clusters kmax is also set. In some embodiments, the maximum number of groups is set by default to kmax=|CLI|, the number of cliques, in which case there is effectively no constraint on the maximum number of groups. The input to the iterative algorithm is the similarity matrix S. In one suitable approach, the similarity matrix S is generated as a scalar products matrix taken from the matrix T designating the cliques (see Equation (22)). For example, S=T·T' yields the similarity matrix elements $S_{ii'}=\langle CLI_i, CLI_{i'} \rangle$. Other similarity measures are also contemplated for use as the similarity matrix S.

The iterative algorithm for maximizing the partition function of Equation (23) has computational cost of order O(nbitr*kmax*P*N). Aggregated vectors can be used to compute the contributions $CONT_j$ with a lower computation cost:

selecting the initial order of cliques, since cliques are being clustered. One illustrative initialization algorithm that is optionally used is as follows:

--- m ← M{$S_{ii'}$}
for i = 1 to N do
  Compute for line i of S, the number of positive contributions relative
  to clique $CLI_i$ : d(i) = $\Sigma_{i'}$ 1 {$S_{ii'} - m \geq 0$}
end for
Re-rank the cliques according to d in the increasing order
  1{A} is the indicator function :

$$1\{A\} = \begin{cases} 1 & \text{if proposition A is true} \\ 0 & \text{else} \end{cases}$$

---

Another illustrative initiation algorithm that is optionally used is as follows:

```
m ← M{S_{ii'}}
for i = 1 to N do
    Compute for the line i of S, the mean contribution relative to clique
    CLI_i : d(i) =

$\frac{1}{N} \sum_{i'} (S_{ii'} - m)$ end for
Re-rank the cliques according to d in the increasing order
```

Both illustrative initialization algorithms are similar in concept. They are based on an estimation of the "degree" of each clique. When launching the heuristic, the first pass, that is, the initialization, gives a kind of direction that is taken when seeking the optimal partition. Accordingly, an inappropriate initial clique order can lead to an inefficient direction and a less than optimal clustering result. The two illustrative initialization algorithms first proceed the most "isolated" cliques, that is, the cliques with the lowest degree values. These "isolated" cliques rapidly generate stable clusters of small size. Then, progressively, by proceeding to address cliques which have higher and higher degree values, more important (i.e., larger) clusters are created that contribute more to the objective function. By ordering the cliques in an increasing order according to their "degrees", stable clusters are first created which typically do not change, followed by addressing more computationally problematic cliques with higher "degree" values for which the assignment to one or another cluster may be less straightforward. As a result, at each iteration, stable small or medium clusters are found, and the larger clusters are refined. The initialization strategies of the illustrative initialization algorithms can also be viewed in terms of noise elimination. If the cliques are re-ranked in the decreasing order of their degrees, noise is introduced in the initialization step as the most "connected" cliques could bring in their constituted clusters more isolated cliques which is not desirable. Rather, by starting with the most isolated cliques as in the case of the illustrative initialization algorithms, the possibility of bringing noise in the constituted clusters is reduced because the most isolated cliques are dealt with first, and henceforth have less probability to be subsequently re-assigned to another cluster.

With continuing reference to FIG. 1, once the named entity groups 32 have been generated it is desirable to assign an annotation to each group. This operation is performed by a group annotator 40, which can be embodied as a user interface (for example, employing the interfacing devices 6, 8 of the computer 4 along with suitable interfacing software) to enable a human user to review the groups 32 and manually assign annotations for each group. Alternatively, an automated annotation algorithm can be used, which automatically assigns an annotation to at least one, and more preferably some or all, of the named entity groups 32 based on the contexts of the named entities belonging to the groups. Various semi-automated approaches can also be used, such as automatically assigning annotations and then enabling a user to review and change the automatic annotation assignments. It will be appreciated that because of the cliques clustering, the number of groups to be annotated is generally reduced as compared with the total number of cliques output by the cliques identifier 20, 22, 24, which expedites manual or semi-manual annotation of the groups. The technique of clustering cliques also ensures that the named entity groups 32 have similar contexts, which facilitates either manual or automated annotation procedures. The output of the group annotator 40 are groups 42 having annotations.

The annotated named entity groups 42 are used by a named entity instance annotator 44 to annotate instances of named entities in the corpus 10, or in an input document other than the content of the corpus 10. Given an instance of a named entity, there are three possible situations: (i) the named entity belongs to only one clique and one group; (ii) the named entity belongs to two or more different cliques but all the cliques belong to the same group; or (iii) the named entity belongs to two or more different cliques that are in more than one different group. In situations (i) and (ii), the named entity unambiguously belongs to the singular group that includes the one or more cliques to which the named entity belongs. In these situations, annotation of the named entity instance is straightforward, since the annotation of the singular group can be assigned to the instance of the named entity.

The third situation, in which the named entity belongs to two or more different cliques that are in more than one different group, is ambiguous. However, since all the named entities in a given group have mutual context similarity, disambiguation of the named entity instance is generally achievable by comparing the context of the named entity instance with the contexts of the two or more groups to which the named entity belongs. Such comparison of context can be performed by context scoring, in which a similarity measure is applied between (i) the context of the named entity instance and (ii) the context associated with each group to which the named entity belongs. The annotation of the group having the highest similarity measure respective to the named entity instance is then assigned to the named entity instance.

Substantially any scoring method can be used to score the context for each group against the named entity instance. Generally, it is expected that a context which occurs frequently with the named entities of a given group should have a high score for this group. A context which occurs very frequently with one of the named entities of the group should generally have a lower score than a context which occurs less frequently but with all the named entities of the group. The following scoring measure respects these constraints:

$$\text{score}(CTXT_i, CLU_j) = \sum_{NE_k \in CLU_j} \frac{D(NE_k, CTXT_i)}{\frac{|NE|}{\sum_{m=1}} D(NE_m, CTXT_i)} \times \sum_{NE_k \in CLU_j} 1_{\{D(NE_k, CTXT_i) \neq 0\}}. \quad (26)$$

A score of $NE_i$ in the cluster $CLU_j$ can be computed as the frequency of named entity $NE_i$ in this cluster, that is, score $(NE_i, CLU_j) = \#(CLU_j, NE_i)$. These scores can be used to compute an annotation matrix $A(NE_m, CTXT_i) = CLU^*$ where $CLU^* = \text{Argmax}_{\{CLU_j: CLU_j \supset NE_m: \text{score}(NE_m, CLU_j) > 1\}}$(score $(CTXT_i, CLU_j)$). In other words, $CLU_j^*$ is the cluster having more than one occurrence of $NE_m$ and having the highest score related to the context $CTXT_i$. A default annotation that does not depend upon local contexts can be defined as $A_{default}(NE_m) = CLU^*$ where $CLU^* = \text{Argmax}_{\{CLU_j: CLU_j \supset \{CLI_j: CLU_j \supset NE_m\}\}} |CLI_j|$. In other words, the default $CLU^*$ is the cluster containing the largest clique $CLU_j$ containing $NE_m$.

For a given instance of the named entity $NE_m$ which is argument (rector or rected) of the syntactic contexts $ctxt_i$, therefore, we have a default annotation $A_{default}(NE_m) = CLU^*$ and an annotation for each $ctxt_i$ of $A(NE_m, ctxt_i) = CLU^*$ if $A(NE_m, ctxt_i)$ is not null. In one approach for annotating the instance of the named entity $NE_m$, the following rules are applied. First, if the annotations $A(NE_m, ctxt_i)$ are consonant, then this annotation is used. Second, if annotations $A(NE_m, ctxt_i)$ are in conflict (for example, one context gives an annotation of type <person> while other contexts give an annotation of type <organization>), then no annotation is applied to the named entity instance. Finally, if annotations $A(NE_m, ctxt_i)$ comprise an empty list, then the default annotation $A_{default}(NE_m)=CLU*$ is used.

The described approach for applying annotations is a voting-based approach, and is merely illustrative. Other approaches for using the groups 42 for annotating specific instances of named entities in the corpus 10 or in an input document are also contemplated.

Figure 2:
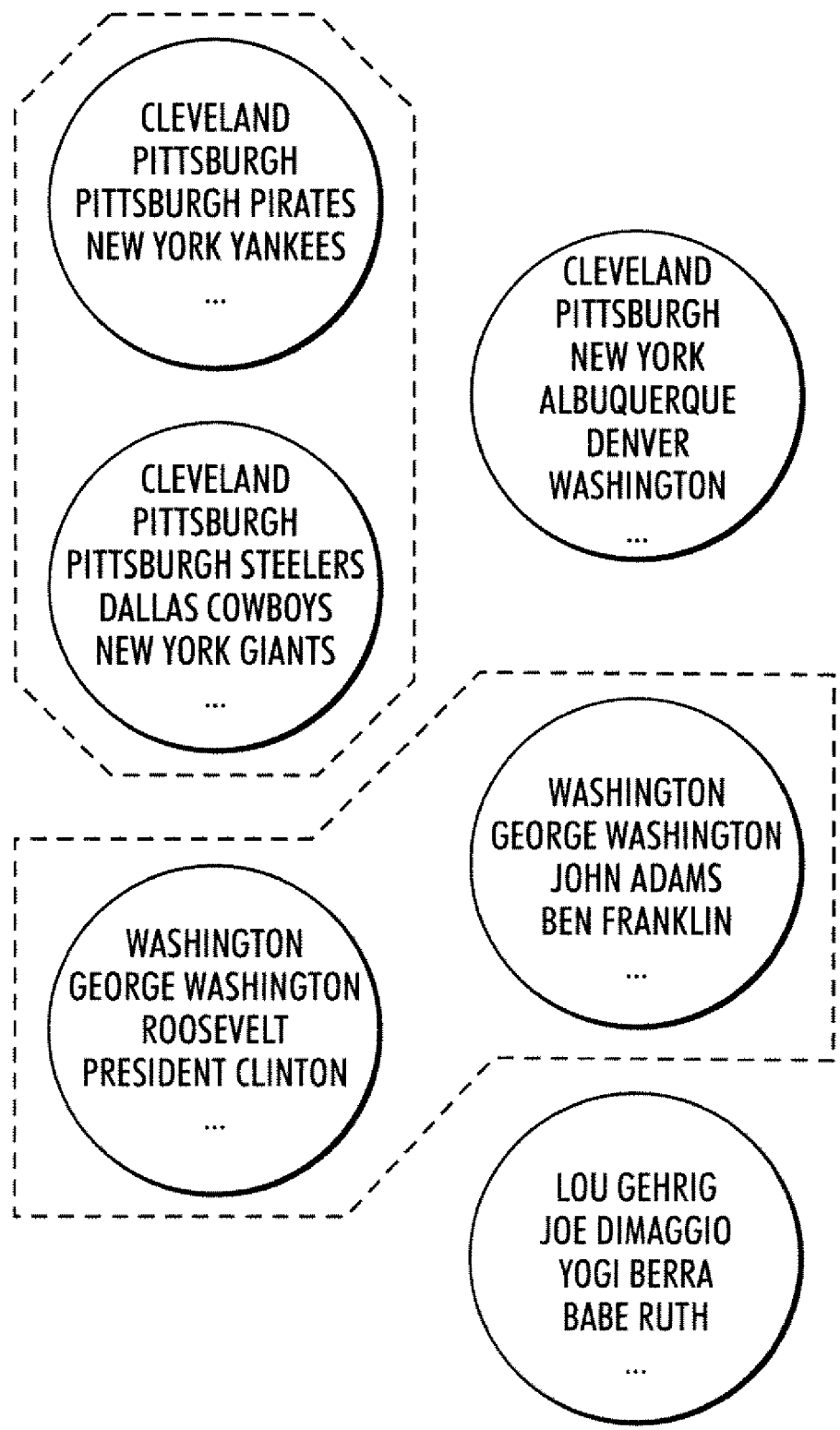
FIGS. 2 and 3 diagrammatically show an illustrative example of clustering and annotating of cliques in accordance with the system of FIG. 1.
Figure 3:
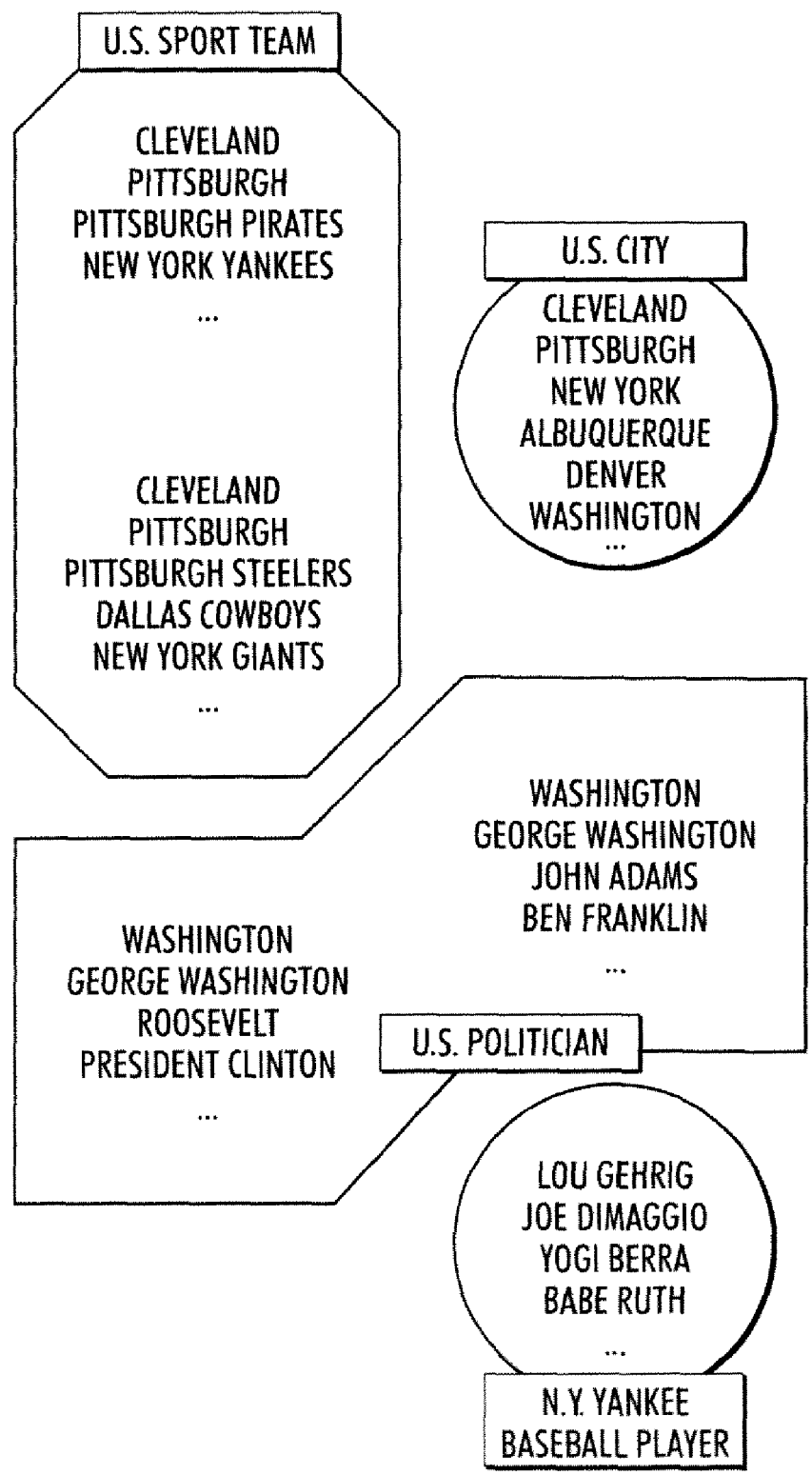

With reference to FIGS. 2 and 3, the cliques-based clustering approach is further described with reference to a diagrammatic example. In FIG. 2, the solid circles represent cliques generated by the cliques identifier 20, 22, 24. It will be noted that the same named entity may be a member of two or more different cliques, as exemplified by "Cleveland" (belonging to three cliques), "Pittsburgh" (belonging to three cliques), "Washington" (belonging to two cliques), and "George Washington" (belonging to two cliques). Cliques can being relatively general (for example, one illustrated clique contains names of cities in the United States) or rather specific (for example, one illustrated clique contains names of persons who have played baseball for the New York Yankees). It will be appreciated that a general clique such as the one containing U.S. cities is likely to be large (that is, likely to contain many named entities) while a specific cliques such as the one containing New York Yankee baseball players is likely to be small (that is, likely to contain only a few named entities).

With continuing reference to FIGS. 2 and 3, the clustering of cliques performed by the cliques clusterer 30 is diagrammatically illustrated by dashed bounding lines in FIG. 2, and the resulting groups are shown with hard bounding lines in FIG. 3. The cliques clustering is a hard clustering, and hence any given clique can belong to no more than one group. In the illustrative example, a group contains cliques specifying United States sports teams, and contains two illustrative cliques, one specifying U.S. Major League Baseball (MLB))™ teams and the other specifying U.S. National Football League (NFL)™ teams. As a second example, another group contains cliques identifying U.S. politicians, and includes as illustrated examples a clique specifying U.S. presidents and a clique specifying U.S. "founding fathers". On the other hand, the cliques clustering is performed in an unconstrained manner (for example, having no predetermined number of groups) and accordingly a clique such as the one specifying New York Yankee baseball players may be maintained as an isolated group (as shown in FIG. 3) if it has substantial mutual context dissimilarity respective to other cliques. The group annotations shown in FIG. 3 (including illustrated annotations "U.S. sport team", "U.S. city", "U.S. politician", and "N.Y. Yankee baseball player") can be applied manually by a human user reviewing the members of each group (for example, using the user interface provided by the computer 4), or can be applied automatically (for example being derived from the contexts of the named entity instances belonging to each group), or in a semi-automated fashion.

The illustrated embodiments have related to named entity recognition systems. However, the disclosed soft clustering approach implemented by clustering of cliques and including as components a cliques identifier 20, 22, 24 and a cliques clusterer 30 can be used in numerous other applications. The disclosed soft clustering performed by clustering of cliques advantageously does not require a priori selection of the number of groups, which enhances flexibility and avoids both forced grouping of unrelated items and forced separation of related items. In general, the soft clustering method comprises: (i) grouping items (named entities in the illustrated embodiments) into non-exclusive cliques based on features associated with the items (contexts in the illustrated embodiments), and (ii) clustering the non-exclusive cliques using a hard clustering algorithm to generate item groups on the basis of mutual similarity of the features of the items constituting the cliques. In the illustrated embodiments, the hard clustering of cliques is performed using a relational analysis-based clustering algorithm, which advantageously does not entail a priori specification of the number of groups. Alternatively, an efficient hard clustering algorithm (for example, k-means) which does entail a priori specification of the number of groups can be used in conjunction with rerunning the efficient hard clustering algorithm with different specified numbers of groups and taking the optimal result. The efficient hard clustering algorithm in conjunction with the rerunning of same using different specified numbers of groups defines a hard clustering algorithm that does not entail a priori specification of the number of groups, and provides the desired flexibility in the number of groups.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An annotation method comprising:
   identifying named entities in a corpus together with contexts wherein the identifying of each named entity identifies the named entity as a noun or noun phrase starting with an upper-case letter;
   grouping the named entities into cliques based on mutual context similarity, each clique including a plurality of different named entities each named entity being a noun or noun phrase starting with an upper-case letter, the named entities of each clique having mutual context similarity, the grouping of the named entities into cliques being non-exclusive in that a named entity can belong to more than one clique;
   clustering the cliques to generate named entity groups each named entity group consisting of one or more cliques, the clustering being performed on the basis of mutual similarity of the contexts of the named entities constituting the cliques;
   assigning annotations to the named entity groups; and
   annotating named entity instances in the corpus based on the named entity groups and corresponding assigned annotations;
   wherein at least the identifying, the grouping, and the clustering are performed by a computer.

2. The annotation method as set forth in claim 1, wherein the clustering comprises hard clustering.

3. The annotation method as set forth in claim 2, wherein the grouping into cliques does not employ a predetermined number of cliques, and the hard clustering does not employ a predetermined number of groups.

4. The annotation method as set forth in claim 2, wherein the hard clustering employs a relational analysis-based clustering algorithm.

5. The annotation method as set forth in claim 4, further comprising:
  generating an initial ordering of cliques for use in the relational analysis-based clustering algorithm, the initial ordering of cliques inputting to the relational analysis-based clustering algorithm (1) cliques that are generally dissimilar from other cliques before (2) cliques that are similar to a substantial number of other cliques.

6. The annotation method as set forth in claim 1, wherein the assigning of annotations to the named entity groups comprises:
  automatically assigning an annotation to at least one of the named entity groups based on the contexts of the named entities constituting said at least one of the named entity groups.

7. The annotation method as set forth in claim 1, wherein the annotating of named entity instances comprises:
  annotating those named entity instances of the corpus or input object for which the named entity belongs to a single named entity group with the annotation assigned to said single named entity group.

8. The annotation method as set forth in claim 7, wherein the annotating further comprises:
  annotating a named entity instance of the corpus or input object for which the named entity belongs to more than one named entity group with the annotation assigned to the named entity group whose constituent named entities have context most similar to the context of the named entity instance of the corpus or input object.

9. An annotation system comprising:
  a named entity detector configured to identify named entities in a corpus together with contexts wherein each named entity identified by the named entity detector is a noun or noun phrase starting with an upper-case letter;
  a cliques identifier configured to receive and group the named entities into cliques based on mutual context similarity, each clique including a plurality of different named entities each named entity being a noun or noun phrase starting with an upper-case letter, the named entities of each clique having mutual context similarity, the cliques being nonexclusive in that a named entity can belong to more than one clique;
  and a cliques clusterer configured to receive and cluster the cliques to generate named entity groups each named entity group consisting of one or more cliques, the clustering being performed on the basis of mutual similarity of the contexts of the named entities constituting the cliques;
  wherein the named entity detector, the cliques identifier, and the cliques clusterer comprise a digital processing device.

10. The annotation system as set forth in claim 9, further comprising:
  a group annotator configured to assign annotations to the named entity groups.

11. The annotation system as set forth in claim 10, further comprising:
  a named entity instance annotator configured to annotate an instance of a named entity in the corpus or in an input document based on membership of the named entity in one or more named entity groups.

12. The annotation system as set forth in claim 10, wherein the group annotator automatically assigns an annotation to at least one of the named entity groups based on the contexts of the named entities constituting said at east one of the named entity groups.

13. The annotation system as set forth in claim 9, wherein the cliques identifier does not utilize a predetermined number of cliques, and the cliques clusterer does not utilize a predetermined number of groups.

14. The annotation system as set forth in claim 10, wherein the cliques clusterer utilizes a relational analysis-based hard clustering algorithm.

15. The annotation system as set forth in claim 14, wherein the cliques clusterer generates an initial ordering of cliques for use in the relational analysis-based hard clustering algorithm, the initial ordering of cliques inputting to the relational analysis-based hard clustering algorithm (1) cliques that are generally dissimilar from other cliques before (2) cliques that are similar to a substantial number of other cliques.

16. The annotation system as set forth in claim 9, wherein the cliques identifier comprises:
  a similarity matrix generator configured to generate a similarity matrix having elements (i,j) indicative of pairwise similarity between named entities indexed by indices i and j;
  a binary adjacency matrix generator configured to convert the similarity matrix to a binary adjacency matrix having elements (i,j) indicative of whether named entities indexed by indices i and j are nearest neighbors; and
  a cliques generator configured to group named entities into cliques based on nearest neighbor information provided by the binary adjacency matrix.

17. A non-transitory storage medium storing instructions executable to perform a soft clustering method comprising:
  (i) Grouping items into non-exclusive cliques based on mutual context similarity, each clique including a plurality of different named entities each named entity being a noun or noun phrase starting with an upper-case letter, the named entities of each clique having mutual context similarity, the grouping of the named entities into cliques being non-exclusive in that a named entity can belong to more than one clique,
  and (ii) Clustering the non-exclusive cliques using a hard clustering algorithm to generate named entity groups each named entity group consisting of one or more cliques, the clustering being performed on the basis of mutual similarity of the contexts of the named entities constituting the cliques.

18. The non-transitory storage medium as set forth in claim 17, wherein the storage medium further stores instructions executable to annotate instances of named entities based on the named entity groups generated by the soft clustering method.

19. The non-transitory storage medium as set forth in claim 17, wherein the hard clustering algorithm comprises a relational analysis-based hard clustering algorithm.

20. The non-transitory storage medium as set forth in claim 17, wherein the grouping comprises (i)(a) generating a similarity matrix having elements (i,j) indicative of similarity of items indexed by indices i and j as measured by the features of the respective items, and (i)(b) grouping the items into non-exclusive cliques on the basis of similarities between items as indicated by the generated similarity matrix.

21. The annotation system as set forth in claim 9, wherein the named entity detector identifies named entities in using the rule that a named entity is identified as a noun or noun phrase starting with an upper-case letter which is a rector argument of an attribute syntactic relation with a noun as rected argument or which is a rected argument of a modifier syntactic relation with a noun as a rector argument.

* * * * *